(12) United States Patent
Fujii

(10) Patent No.: US 10,505,231 B2
(45) Date of Patent: Dec. 10, 2019

(54) LITHIUM ION SECONDARY BATTERY ELEMENT AND LITHIUM ION SECONDARY BATTERY

(71) Applicant: Envision AESC Japan Ltd., Zama-Shi, Kanagawa (JP)

(72) Inventor: Takayuki Fujii, Zama (JP)

(73) Assignee: ENVISION AESC JAPAN LTD., Kanagawa (JP)

( * ) Notice: Subject to any disclaimer, the term of this patent is extended or adjusted under 35 U.S.C. 154(b) by 52 days.

(21) Appl. No.: 16/005,797

(22) Filed: Jun. 12, 2018

(65) Prior Publication Data

US 2018/0366786 A1 Dec. 20, 2018

(30) Foreign Application Priority Data

Jun. 14, 2017 (JP) ................. 2017-116533

(51) Int. Cl.
*H01M 4/02* (2006.01)
*H01M 10/0585* (2010.01)
(Continued)

(52) U.S. Cl.
CPC ......... *H01M 10/0585* (2013.01); *H01M 2/26* (2013.01); *H01M 2/34* (2013.01);
(Continued)

(58) Field of Classification Search
CPC ...................................... H01M 4/02
See application file for complete search history.

(56) References Cited

U.S. PATENT DOCUMENTS

2016/0359189 A1\* 12/2016 Fukatsu ............... H01M 4/133
2017/0373299 A1 12/2017 Takeda et al.

FOREIGN PATENT DOCUMENTS

WO 2016121734 A1 8/2016

OTHER PUBLICATIONS

Extended European Search Report dated Nov. 15, 2018 for the corresponding European Patent Application No. 18177428.2.

\* cited by examiner

*Primary Examiner* — Jacob B Marks
(74) *Attorney, Agent, or Firm* — Troutman Sanders LLP

(57) ABSTRACT

A lithium ion secondary battery element includes: a positive electrode that includes a positive electrode current collector including a positive electrode active material applied part where a positive electrode active material is applied to form a positive electrode active material layer, and including a positive electrode active material non-applied part where the positive electrode active material is not applied, the positive electrode active material layer including a positive electrode active material layer flat part and a positive electrode active material layer thin part that is thinner than the positive electrode active material layer flat part, and the positive electrode further including an insulating member that covers at least a part of the positive electrode active material layer thin part and at least a part of the positive electrode active material non-applied part; a separator; and a negative electrode that includes a negative electrode current collector including a negative electrode active material applied part where a negative electrode active material is applied to form a negative electrode active material layer, and including a negative electrode active material non-applied part where the negative electrode active material is not applied, wherein: the positive electrode, the separator, and the negative electrode are stacked in this order; and the positive electrode active material non-applied part and the negative electrode active material non-applied part face each other through the separator.

11 Claims, 5 Drawing Sheets

(51) Int. Cl.
*H01M 10/04* (2006.01)
*H01M 2/26* (2006.01)
*H01M 4/36* (2006.01)
*H01M 4/13* (2010.01)
*H01M 10/056* (2010.01)
*H01M 10/052* (2010.01)
*H01M 2/34* (2006.01)

(52) U.S. Cl.
CPC ............... *H01M 4/13* (2013.01); *H01M 4/36* (2013.01); *H01M 10/04* (2013.01); *H01M 10/052* (2013.01); *H01M 10/056* (2013.01)

LITHIUM ION SECONDARY BATTERY ELEMENT AND LITHIUM ION SECONDARY BATTERY

CROSS-REFERENCE TO RELATED APPLICATION

This application claims priority from Japanese Patent Application No. 2017-116533 filed with the Japan Patent Office on Jun. 14, 2017, the entire content of which is hereby incorporated by reference.

BACKGROUND

1. Technical Field

The present disclosure relates to a lithium ion secondary battery element, and a nonaqueous electrolyte battery, particularly a lithium ion secondary battery, including this lithium ion secondary battery element.

2. Description of the Related Art

Nonaqueous electrolyte batteries have been put into practical use as batteries for automobiles including hybrid vehicles and electric vehicles. One example of such batteries for on-vehicle power sources is a lithium ion secondary battery. The lithium ion secondary battery is required to have various characteristics including an output characteristic, energy density, capacity, lifetime, and high-temperature stability. In particular, in order to improve the stability and the lifetime of the battery, various improvements have been attempted in regard to a battery structure including an electrode and electrolyte solution.

Examples of the lithium ion secondary battery include a wound type battery and a stacked type battery (hereinafter also referred to as "laminate type battery"). In the wound type battery, a positive electrode, a negative electrode, and a separator are stacked, wound, and sealed in a container such as a can together with an electrolyte solution. In the stacked type battery, a sheet-shaped material including a positive electrode, a negative electrode, and a separator that are stacked is sealed inside a relatively flexible package together with an electrolyte solution. In particular, the stacked type battery has high weight energy and a high degree of freedom in shape; therefore, the stacked type battery is suitably used as the battery for the on-vehicle power source.

A laminate type secondary battery includes a battery element. In the battery element, a positive electrode in which a positive electrode active material is applied on a positive electrode current collector and a negative electrode in which a negative electrode active material is applied on a negative electrode current collector are stacked with a separator. Then, the battery element is sealed inside the package in a manner that a positive electrode tab connected to the positive electrode current collector and a negative electrode tab connected to the negative electrode current collector are extracted out of the package. Thus, the positive electrode current collector includes a positive electrode active material non-applied part for providing the positive electrode tab. The negative electrode current collector includes a negative electrode active material non-applied part for providing the negative electrode tab. In a border part between the positive electrode active material applied part and non-applied part and a border part between the negative electrode active material applied part and non-applied part, an unexpected situation may occur in charging and discharging a battery; for example, metal lithium is deposited. This may result in lower reliability of the battery. In addition, in order to increase the capacity of the battery, each electrode active material is applied more thickly. This increases the possibility that various inconveniences occur in the border part between the electrode active material applied part and non-applied part.

For the purpose of improving the reliability of the battery, it is suggested to adjust the charge-discharge capacity ratio (A/C ratio) of the negative electrode to the positive electrode on the entire surface of each electrode (WO 2016/121734 A). According to WO 2016/121734 A, it is suggested to change the A/C ratio in an outer edge part and a central part of each electrode, that is, set the A/C ratio in the central part to be larger than the A/C ratio in the outer edge part.

SUMMARY

A lithium ion secondary battery element includes: a positive electrode that includes a positive electrode current collector including a positive electrode active material applied part where a positive electrode active material is applied to form a positive electrode active material layer, and including a positive electrode active material non-applied part where the positive electrode active material is not applied, the positive electrode active material layer including a positive electrode active material layer flat part and a positive electrode active material layer thin part that is thinner than the positive electrode active material layer flat part, and the positive electrode further including an insulating member that covers at least a part of the positive electrode active material layer thin part and at least a part of the positive electrode active material non-applied part; a separator; and a negative electrode that includes a negative electrode current collector including a negative electrode active material applied part where a negative electrode active material is applied to form a negative electrode active material layer, and including a negative electrode active material non-applied part where the negative electrode active material is not applied, wherein: the positive electrode, the separator, and the negative electrode are stacked in this order; and the positive electrode active material non-applied part and the negative electrode active material non-applied part face each other through the separator.

DESCRIPTION OF THE EMBODIMENTS

Figure 1:
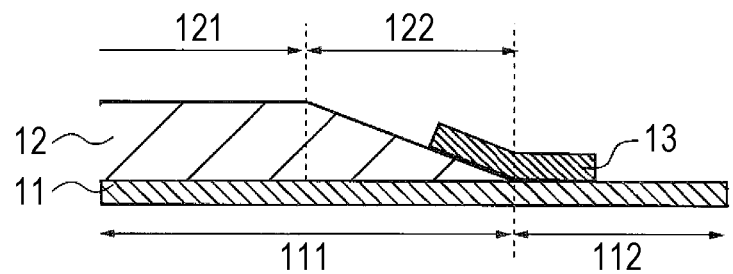
FIG. 1 is a cross-sectional view illustrating a positive electrode used in a lithium ion secondary battery element according to an embodiment of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In the typical technique suggested in WO 2016/121734 A, the deposition of metal lithium on the negative electrode is suppressed by examining the A/C ratio in each part of the electrode. However, further examinations are necessary to improve the reliability of the lithium ion secondary battery.

One object of the present disclosure is to provide an element for a lithium ion secondary battery with high durability and high capacity, and a lithium ion secondary battery.

A lithium ion secondary battery element according to an embodiment of the present invention includes: a positive electrode that includes a positive electrode current collector including a positive electrode active material applied part where a positive electrode active material is applied to form a positive electrode active material layer, and including a positive electrode active material non-applied part where the positive electrode active material is not applied, the positive electrode active material layer including a positive electrode active material layer flat part and a positive electrode active material layer thin part that is thinner than the positive electrode active material layer flat part, and the positive electrode further including an insulating member that covers at least a part of the positive electrode active material layer thin part and at least a part of the positive electrode active material non-applied part; a separator; and a negative electrode that includes a negative electrode current collector including a negative electrode active material applied part where a negative electrode active material is applied to form a negative electrode active material layer, and including a negative electrode active material non-applied part where the negative electrode active material is not applied, wherein: the positive electrode, the separator, and the negative electrode are stacked in this order; the positive electrode active material non-applied part and the negative electrode active material non-applied part face each other through the separator; when a positive electrode charging capacity at an initial charging of a first part of the positive electrode active material layer thin part that is not covered with the insulating member is $C_E$ and a negative electrode charging capacity at the initial charging of a second part of the negative electrode that faces the first part through the separator is $A_E$, a charging capacity ratio $A_E/C_E$ is in a range of more than 1.10 to less than 1.34; when a positive electrode charging capacity at the initial charging of the positive electrode active material layer flat part is $C_C$ and a negative electrode charging capacity at the initial charging of a third part of the negative electrode that faces the positive electrode active material layer flat part through the separator is $A_C$, a charging capacity ratio $A_C/C_C$ is in a range of more than 1.05 to less than 1.20; and a value of the charging capacity ratio $A_E/C_E$ is larger than a value of the charging capacity ratio $A_C/C_C$.

Here, the positive electrode active material layer thin part may be a part that becomes thinner toward a border part between the positive electrode active material applied part and the positive electrode active material non-applied part.

The lithium ion secondary battery element according to the embodiment of the present disclosure includes the positive electrode active material layer thin part; therefore, the expansion (increase in thickness) of an end of the battery element can be suppressed.

In addition, by setting the charging capacity ratio of the positive electrode and the negative electrode for each part of the electrode as appropriate, the output of the battery can be increased while the deposition of metal lithium is suppressed and the reliability of the battery is maintained.

An embodiment of the present disclosure will hereinafter be described. A lithium ion secondary battery element according to the present embodiment includes a positive electrode in which a positive electrode active material mixture is applied, a separator, and a negative electrode in which a negative electrode active material mixture is applied. The positive electrode, the separator, and the negative electrode are stacked on each other. The positive electrode according to the embodiment is a rectangular battery member including a positive electrode current collector such as a metal foil and a positive electrode active material layer, and has a thin-plate shape or a sheet shape. The positive electrode active material layer is formed by applying, or rolling and drying a mixture (positive electrode active material mixture) on the positive electrode current collector. The mixture includes a positive electrode active material, a binder, and if necessary, a conductive agent. The negative electrode is a battery member including a negative electrode current collector and a negative electrode active material layer, and has a thin-plate shape or a sheet shape. The negative electrode active material layer is formed by applying a mixture (negative electrode active material mixture) on the negative electrode current collector. The mixture includes a negative electrode active material, a binder, and if necessary, a conductive agent. The separator is a battery member with a film shape. This member secures the conductivity of lithium ions between the negative electrode and the positive electrode by separating the positive electrode and the negative electrode. The positive electrode, the negative electrode, and the separator are stacked, so that the lithium ion secondary battery element according to the embodiment is formed.

Detailed description is made of members that form the lithium ion secondary battery element. The positive electrode that can be used in all the embodiments is the positive electrode where the positive electrode active material is applied. The positive electrode active material layer of the positive electrode is formed as below. The positive electrode active material mixture including the positive electrode active material, the binder, and the conductive material that is added as necessary is applied or rolled on the positive electrode current collector including a metal foil such as an aluminum foil. After that, a drying step is performed and thus, the positive electrode active material layer is obtained. The positive electrode active material layer preferably includes a porous shape or a microporous shape including pores. In each embodiment, the positive electrode active material layer preferably includes the positive electrode active material containing a lithium nickel composite oxide. The lithium nickel composite oxide is a transition metal composite oxide containing lithium and nickel, which is expressed by general formula $Li_xNi_yMe_{(1-y)}O_2$ (where Me represents at least one or more kinds of metal selected from the group consisting of Al, Mn, Na, Fe, Co, Cr, Cu, Zn, Ca, K, Mg, and Pb).

The positive electrode active material layer can include the positive electrode active material containing a lithium manganese composite oxide. Examples of the lithium manganese composite oxide include lithium manganate ($LiMnO_2$) with a zigzag layer structure, and spinel type lithium manganate ($LiMn_2O_4$). By using the lithium manganese composite oxide in combination, the positive electrode can be manufactured at lower cost. In particular, the spinel type lithium manganate ($LiMn_2O_4$) is preferably used because of being excellent in stability of crystal structure in an over-charged state. In a case where the lithium manganese positive electrode active material is contained, the lithium manganese positive electrode active material is preferably contained by 70 wt % or less, more preferably 30 wt % or less, relative to the weight of the positive electrode active material. In a case of using a mixed positive electrode, containing too much lithium manganese composite oxide in the positive electrode active material results in easy formation of a partial battery between the mixed positive electrode and a deposition derived from the metal foreign substance that can be mixed in the battery; thus, a short-circuiting current easily flows.

The positive electrode active material layer particularly preferably includes the positive electrode active material containing a lithium nickel manganese cobalt composite oxide with a layer crystal structure, which is represented by general formula $Li_xNi_yCo_zMn_{(1-y-z)}O_2$. In this general formula, x is a numeral satisfying $1 \le x \le 1.2$, y and z are positive numerals satisfying $y+z<1$, and y is a numeral of 0.5 or less. As manganese is contained more, it becomes less easy to synthesize a composite oxide with a single phase. Therefore, desirably, $1-y-z \le 0.4$ is satisfied. In addition, as cobalt is contained more, the cost is increased and the capacity is reduced. Therefore, desirably, $z<y$ and $z<1-y-z$ are satisfied. In order to obtain the battery with high capacity, desirably, $y>1-y-z$ and $y>z$ are satisfied. The lithium nickel composite oxide with this general formula is a lithium nickel cobalt manganese composite oxide (hereinafter also referred to as "NCM"). NCM is a lithium nickel composite oxide that is suitably used to increase the capacity of the battery. For example, a composite oxide satisfying the general formula $Li_xNi_yCo_zMn_{(1.0-y-z)}O_2$ where x is 1, y is 0.4, and z is 0.3 is referred to as "NCM433", and a composite oxide satisfying the general formula $Li_xNi_yCo_zMn_{(1.0-y-z)}O_2$ where x is 1, y is 0.5, and z is 0.2 is referred to as "NCM523".

Examples of the binder to be used for the positive electrode active material layer include: fluorine resins such as polyvinylidene fluoride (PVDF), polytetrafluoroethylene (PTFE), and polyvinyl fluoride (PVF); conductive polymers such as polyanilines, polythiophenes, polyacetylenes, and polypyrroles; synthetic rubbers such as styrene butadiene rubber (SBR), butadiene rubber (BR), chloroprene rubber (CR), isoprene rubber (IR), and acrylonitrile butadiene rubber (NBR); and polysaccharides such as carboxymethyl cellulose (CMC), xanthan gum, guar gum, and pectin.

Examples of the conductive material to be used as necessary for the positive electrode active material layer include carbon black, for example, carbon fiber such as carbon nanofiber, acetylene black, and Ketjen black, activated carbon, graphite, mesoporous carbon, fullerenes, carbon nanotube, and other carbon materials. Moreover, for the positive electrode active material layer, an additive that is generally used for forming an electrode, such as thickener, dispersant, or stabilizer, can be used as appropriate.

The positive electrode active material layer may be formed on the entire surface of the positive electrode current collector. Alternatively, the positive electrode current collector may include a non-applied part where the positive electrode active material is not applied (positive electrode active material non-applied part). The positive electrode active material non-applied part on the positive electrode current collector is provided particularly to connect a positive electrode lead. The positive electrode active material layer may be formed to have uniform thickness or different thicknesses depending on the applied part. The positive electrode active material layer preferably includes a positive electrode active material layer thin part and a positive electrode active material layer flat part. The positive electrode active material layer thin part is a part that becomes thinner toward a border part between the positive electrode active material applied part and the positive electrode active material non-applied part. In addition, preferably, an insulating member is provided so as to cover at least a part of the positive electrode active material layer thin part provided in this manner and at least a part of the positive electrode active material non-applied part. In a case where the positive electrode active material non-applied part is provided to face the negative electrode active material applied part, short-circuiting may occur in a region where these parts face each other. The occurrence of the short-circuiting may generate a larger amount of heat in that part. In view of this, in order to suppress such a problem, an insulating member may be provided. As the insulating member, an adhesive tape including a polyolefin film and an adhesive layer provided to the polyolefin film can be used. The structure of the positive electrode will be described below with reference to the drawings.

The negative electrode that can be used in all the embodiments is the negative electrode where the negative electrode active material mixture is applied. The negative electrode active material layer of the negative electrode is formed as below. The negative electrode active material mixture including the negative electrode active material, the binder, and the conductive agent that is added if necessary is applied or rolled on the negative electrode current collector including a metal foil such as a copper foil. After that, through a drying step, the negative electrode active material layer is obtained. The negative electrode active material layer preferably includes a porous shape or a microporous shape including pores. In each embodiment, the negative electrode active material includes graphite. In particular, containing graphite in the negative electrode active material layer is advantageous in that the output of the battery can be improved even when the state of charge (SOC) of the battery is low. Graphite is a hexagonal crystal carbon material having the hexagonal-plate-like crystal structure, and is also referred to as black lead or the like. The shape of the graphite is preferably like a particle.

Examples of graphite (graphite particles) include natural graphite (natural graphite particles) and artificial graphite (artificial graphite particles). Natural graphite is inexpensive and can be obtained in large quantities, and has a stable structure and excellent durability. Artificial graphite is the graphite produced artificially. Since the artificial graphite has high purity (the impurities such as allotropes are hardly contained), the artificial graphite has the low electric resistance. Either the natural graphite or the artificial graphite can be used suitably as the carbon material in the embodiment. Either the natural graphite covered with amorphous carbon or the artificial graphite covered with amorphous carbon can be used.

Amorphous carbon may partially include a structure similar to graphite. Amorphous carbon is the carbon material with a structure including microcrystals forming the network randomly and is amorphous as a whole. Examples of the amorphous carbon include carbon black, coke, activated carbon, carbon fiber, hard carbon, soft carbon, and mesoporous carbon.

These negative electrode active materials may be mixed to be used depending on a case. In addition, graphite covered with amorphous carbon can be used. When the mixed carbon material including both the graphite particles and the amorphous carbon particles is used as the negative electrode active material, the regeneration performance of the battery is improved. When the natural graphite particles coated with an amorphous carbon layer or the artificial graphite coated with an amorphous carbon layer is used as the carbon material of the negative electrode active material, the decomposition of the electrolyte solution is suppressed; therefore, the durability of the negative electrode is improved.

When the artificial graphite is used as the graphite, the interlayer distance d value ($d_{002}$) is preferably 0.337 nm or more. The structure of the crystal of the artificial graphite is usually thinner than that of the natural graphite. In a case of using the negative electrode active material for a lithium ion secondary battery including the artificial graphite, it is necessary that the artificial graphite has an interlayer distance that enables the intercalation of lithium ions. The interlayer distance that enables the intercalation and deintercalation of lithium ions can be estimated based on the d value ($d_{002}$). When the d value is 0.337 nm or more, the intercalation and deintercalation of lithium ions are possible without a problem.

Examples of the binder used for the negative electrode active material layer include: fluorine resins such as polyvinylidene fluoride (PVDF), polytetrafluoroethylene (PTFE), and polyvinyl fluoride (PVF); conductive polymers such as polyanilines, polythiophenes, polyacetylenes, and polypyrroles; synthetic rubber such as styrene butadiene rubber (SBR), butadiene rubber (BR), chloroprene rubber (CR), isoprene rubber (IR), and acrylonitrile butadiene rubber (NBR); and polysaccharides such as carboxymethyl cellulose (CMC), xanthan gum, guar gum, and pectin.

Examples of the conductive agent used if necessary for the negative electrode active material layer include carbon materials including carbon black, for example, carbon fiber such as carbon nanofiber, acetylene black, and Ketjen black, activated carbon, mesoporous carbon, fullerenes, carbon nanotube, and other carbon materials. In addition, the negative electrode active material layer may contain an additive generally used for forming the electrode, such as thickener, dispersant, and stabilizer, as appropriate.

The negative electrode active material layer may be formed on the entire surface of the negative electrode current collector. Alternatively, the negative electrode current collector may include a non-applied part where the negative electrode active material is not applied (negative electrode active material non-applied part). The negative electrode active material non-applied part on the negative electrode current collector is provided particularly to connect a negative electrode lead. The negative electrode active material layer may be formed to have uniform thickness or different thicknesses depending on the applied part. The negative electrode active material layer may include a negative electrode active material layer thin part and a negative electrode active material layer flat part. The negative electrode active material layer thin part is a part that becomes thinner toward a border part between the negative electrode active material applied part and the negative electrode active material non-applied part.

In the positive electrode and the negative electrode that can be used in all the embodiments, the electrode active material layer including the positive electrode active material or the negative electrode active material described above is disposed on the electrode current collector. At this time, the thickness of each electrode active material layer is preferably 10 to 100 µm on each surface, more preferably 50 to 80 µm on each surface. When the electrode active material layer is too thin, it may be difficult to form the uniform electrode active material layer. On the other hand, when the electrode active material layer is too thick, the charge-discharge performance at a high rate may deteriorate. Note that on the entire surface of the negative electrode active material layer, the negative electrode active material layer is preferably thicker than the positive electrode active material layer that is provided to face the negative electrode active material layer through the separator.

The lithium ion secondary battery element according to the embodiment can include a polyolefin film as the separator, for example. Polyolefin is a compound that can be obtained by polymerizing or co-polymerizing α-olefin such as ethylene, propylene, butene, pentene, or hexene. Examples of polyolefin include polyethylene, polypropylene, polybutene, polypentene, polyhexene, and a copolymer of these. A preferable polyolefin film used as the separator is a porous or microporous polyolefin film with a structure including pores that are closed when the battery temperature is increased. When the polyolefin film has such a structure, even if the battery temperature should increase, the separator is closed (shut down) to block the ion flow. That is to say, when the battery is heated, a uniaxially stretched polyolefin film shrinks so that the pores are closed. Thus, the short-circuiting between the positive and negative electrodes can be suppressed. In order to achieve the shutdown effect, preferably, a porous polyethylene film is used.

A cross-linked film may be used as the separator. The porous or microporous polyolefin film has a property of shrinking when heat is applied. Therefore, when the battery is overheated, the film shrinks so that shutdown occurs. However, if the thermal shrinkage of the film is too large, the area of the film may change largely and in this case, a large amount of current may be generated. A cross-linked polyolefin film has a proper thermal shrinkage; therefore, this film can shrink only to close the pores without largely changing in area.

The separator that can be used in all the embodiments may include a heat-resistant microparticle layer depending on a case. In this case, the heat-resistant microparticle layer is provided in order to prevent the battery function from being stopped by the overheat of the battery. This heat-resistant microparticle layer includes stable, heat-resistant inorganic microparticles that can resist temperatures of 150° C. or more and electrochemically react less easily. Examples of such heat-resistant inorganic microparticles include inorganic oxides such as silica, alumina (α-alumina, β-alumina, and θ-alumina), iron oxide, titanium oxide, barium titanate, and zirconium oxide, and minerals such as boehmite, zeolite, apatite, kaolin, spinel, mica, and mullite.

Each of the positive electrode, the separator, and the negative electrode described above includes an independent sheet shape. These are stacked so that the separator is disposed between the positive electrode sheet and the negative electrode sheet, and thus the sheet-shaped lithium ion secondary battery element is formed. Here, preferably, the positive electrode, the separator, and the negative electrode are stacked so that the positive electrode active material non-applied part and the negative electrode active material non-applied part face each other through the separator. The stacking in which the positive electrode active material non-applied part and the negative electrode active material non-applied part face each other refers to, for example, the stacking in which, when the positive electrode and the negative electrode with a rectangular sheet shape are overlapped on each other, the positive electrode active material non-applied part and the negative electrode active material non-applied part come to the same side among four sides of the rectangular shape. By overlapping the positive electrode and the negative electrode in this manner, the positive electrode tab and the negative electrode tab are extracted out of one of four sides of the rectangular lithium ion secondary battery. The structure of the lithium ion secondary battery according to the embodiment will be described below with reference to the drawings.

Such a lithium ion secondary battery element with the sheet shape is impregnated with the electrolyte solution, and then the lithium ion secondary battery element is sealed by a package; thus, the lithium ion battery can be completed. Sealing means covering the lithium ion secondary battery element with a relatively flexible package material so that at least a part of the lithium ion secondary battery element is not exposed to the external air. The package of the lithium ion secondary battery is a casing that has a gas barrier property and can seal the lithium ion secondary battery element, or a bag-like shape that is formed of a flexible material. As the package, an aluminum laminate sheet including, for example, an aluminum foil and polypropylene that are stacked can be used suitably. The lithium ion secondary battery may be in various modes including a coin type battery, a laminate type battery, a wound type battery, and the like.

The electrolyte solution is an electrically conductive solution that is obtained by dissolving an ionic substance in a solvent. In the embodiment, particularly, a nonaqueous electrolyte solution can be used as the electrolyte solution. The lithium ion secondary battery element includes the positive electrode, the negative electrode, and the separator that are stacked, and the electrolyte solution. The lithium ion secondary battery element is one unit of main components of the battery. In the lithium ion secondary battery element, usually, the stack including a plurality of rectangular positive electrodes and a plurality of rectangular negative electrodes that are stacked through a plurality of rectangular separators is impregnated with the electrolyte solution. Examples of the electrolyte solution that is preferably used in the embodiment of the present specification include a mixture including: a linear carbonate such as dimethyl carbonate (DMC), diethyl carbonate (DEC), ethylmethyl carbonate (EMC), di-n-propyl carbonate, di-i-propyl carbonate, di-n-butyl carbonate, di-isobutyl carbonate, or di-t-butyl carbonate; and a cyclic carbonate such as propylene carbonate (PC) or ethylene carbonate (EC). The electrolyte solution is obtained by dissolving a lithium salt such as lithium hexafluorophosphate ($LiPF_6$), lithium tetrafluoroborate ($LiBF_4$), or lithium perchlorate ($LiClO_4$) in such a carbonate mixture.

The electrolyte solution may contain a cyclic carbonate compound different from the aforementioned cyclic carbonate as the additive. Examples of the cyclic carbonate used as the additive include vinylene carbonate (VC). Another example is a cyclic carbonate compound with a halogen as the additive. These cyclic carbonates are the compounds that form a protective film for the positive electrode and the negative electrode in the process of charging and discharging the battery. In particular, the cyclic carbonates can prevent the sulfur-containing compound such as a disulfonic acid compound or a disulfonic acid ester compound from attacking the positive electrode active material containing the lithium nickel composite oxide. Examples of the cyclic carbonate compounds with a halogen include fluoroethylene carbonate (FEC), difluoroethylene carbonate, trifluoroethylene carbonate, chloroethylene carbonate, dichloroethylene carbonate, and trichloroethylene carbonate. It is particularly preferable to use fluoroethylene carbonate corresponding to the cyclic carbonate compound with a halogen and an unsaturated bond.

The electrolyte solution may further include a disulfonic acid compound as the additive. The disulfonic acid compound is a compound having two sulfo groups in one molecule. The disulfonic acid compound incorporates a disulfonate compound corresponding to a salt formed by the reaction between the sulfo group and the metal ion, and a disulfonic acid ester compound having the ester bond including the sulfo group. One or two of the sulfo groups of the disulfonic acid compound may react with the metal ion to form the salt or may be in the anion state. Examples of the disulfonic acid compound include methanedisulfonic acid, 1,2-ethanedisulfonic acid, 1,3-propanedisulfonic acid, 1,4-butanedisulfonic acid, benzenedisulfonic acid, naphthalenedisulfonic acid, biphenyldisulfonic acid, salts thereof (such as lithium methanedisulfonate and lithium 1,2-ethanedisulfonate), and anions thereof (such as methanedisulfonic acid anion and 1,2-ethanedisulfonic acid anion). Other examples of the disulfonic acid compound include a disulfonic acid ester compound. Among these disulfonic acid esters, linear disulfonic acid esters of alkyl diester and aryl diester, such as methanedisulfonic acid, 1,2-ethanedisulfonic acid, 1,3-propanedisulfonic acid, 1,4-butanedisulfonic acid, benzenedisulfonic acid, naphthalenedisulfonic acid, and biphenyldisulfonic acid, and cyclic disulfonic acid esters such as methylene methanedisulfonate, ethylene methanedisulfonate, and propylene methanedisulfonate are preferably used. Methylene methanedisulfonate (MMDS) is particularly preferable.

By forming the stack by stacking the positive electrode and the negative electrode described above through the separator, and by sealing this stack inside the package together with the electrolyte solution, the laminate type lithium ion secondary battery can be formed. The package may be formed of any material that does not allow the electrolyte solution to exude. The package may include a heat-resistant protective layer of polyester, polyamide, liquid crystal polymer, or the like on the outermost layer. The package may include a laminate film including a sealant layer including thermoplastic resin on the innermost layer. Examples of the thermoplastic resin include polyethylene, polypropylene, ionomer, acid modified polyethylene such as maleic acid modified polyethylene, acid modified polypropylene such as maleic acid modified polypropylene, polyethylene terephthalate (PET), polyethylene naphthalate (PEN), polyethylene isophthalate (PEI), a blend of PET and PEN, a blend of PET and PEI, polyamide resin, a blend of polyamide resin and PET, and a blend of polyamide containing a xylene group and PET. The package may be formed using one sheet of these laminate films. Alternatively, the package may be formed of more layers by attaching or welding combinations of a plurality of sheets of these laminate films. The metal layer with a gas barrier property may be formed of aluminum, tin, copper, nickel, or stainless steel. The thickness of the metal layer is preferably in a range of 30 to 50 μm. It is particularly preferable that an aluminum laminate corresponding to a stack of an aluminum foil and a polymer such as polyethylene or polypropylene.

As a manufacturing method for a lithium ion secondary battery according to the embodiment, a typical method can be employed without a particular limitation. For example, the positive electrode and negative electrode tab leads are connected to the stack of the positive electrode, the separator, and the negative electrode by a method of ultrasonic welding or the like. After that, the stack is disposed at a predetermined position of the package material cut out into a rectangle. Next, a part (flange part) of the package that overlaps with the positive electrode and negative electrode tabs is heat-sealed. After that, one side of the package material among the sides that do not correspond to the tab extraction portion is heat-sealed to form a bag-shaped package. Next, the electrolyte solution is poured into the bag. Finally, the last one side is heat-sealed under reduced pressure. Note that the tab lead of each electrode to be used here is a terminal used to input and output electricity between the positive electrode or the negative electrode in the battery and the outside. As the negative electrode tab of the lithium ion secondary battery, nickel or a copper conductor plated with nickel can be used. As the positive electrode tab of the lithium ion secondary battery, an aluminum conductor can be used.

Subsequently, with reference to FIG. 1, a structure of the positive electrode of the lithium ion secondary battery element according to the embodiment is described. FIG. 1 is a cross-sectional view illustrating an example of the positive electrode used in the embodiment. In FIG. 1, the size, the scale, and the like of each component are different from the actual ones. As illustrated in FIG. 1, the positive electrode includes a positive electrode current collector 11, a positive electrode active material layer 12, and an insulating member 13. The positive electrode active material layer 12 includes a positive electrode active material layer flat part 121, and a positive electrode active material layer thin part 122. The positive electrode current collector 11 includes a positive electrode active material applied part 111 where the positive electrode active material layer 12 is provided, and a positive electrode active material non-applied part 112 where the positive electrode active material layer 12 is not provided. As illustrated in FIG. 1, the positive electrode active material layer thin part 122 is provided toward a border part between the positive electrode active material applied part 111 and the positive electrode active material non-applied part 112. That is to say, the positive electrode active material layer thin part 122 is provided so that an end of a surface thereof is in contact with (or close to) the border part between the positive electrode active material applied part 111 and the positive electrode active material non-applied part 112.

In FIG. 1, the positive electrode active material layer thin part 122 is provided so that the thickness gradually decreases toward the border part between the positive electrode active material applied part 111 and the positive electrode active material non-applied part 112. Instead of this, the positive electrode active material layer thin part 122 with a predetermined thickness may be formed. That is to say, it is important that the thickness of the positive electrode active material layer thin part 122 is smaller than the thickness of the positive electrode active material layer flat part 121. That is to say, the positive electrode active material layer thin part 122 includes a part that is thinner than the positive electrode active material layer flat part 121. Preferably, the positive electrode active material layer thin part 122 has an approximately constant thickness that is smaller than the thickness of the positive electrode active material layer flat part 121. A portion where the positive electrode active material layer thin part 122 starts, that is, a border part between the positive electrode active material layer flat part 121 and the positive electrode active material layer thin part 122 corresponds to a start end.

Figure 2:
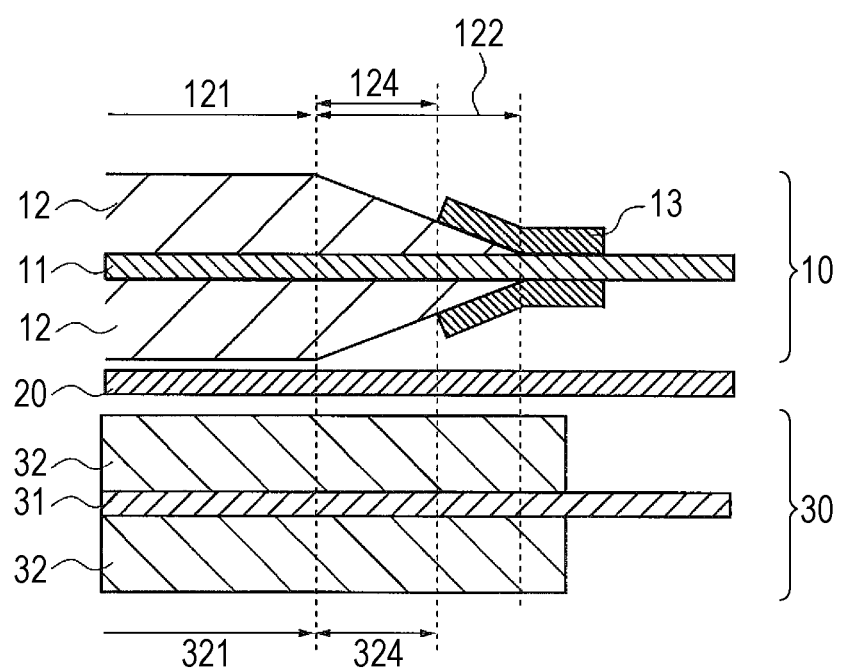
FIG. 2 is a cross-sectional view of the lithium ion secondary battery element.

Next, a structure example of the lithium ion secondary battery element according to the embodiment is described with reference to FIG. 2. FIG. 2 is a cross-sectional view of the lithium ion secondary battery element according to the embodiment. In FIG. 2, the size, the scale, and the like of each component are different from the actual ones. The lithium ion secondary battery element mainly includes a positive electrode 10, a separator 20, and a negative electrode 30. In FIG. 2, the positive electrode 10, the separator 20, and the negative electrode 30 are arranged and spaced apart from each other. However, in fact, these components are stacked so that the adjacent members are in contact with each other. The positive electrode 10 includes the positive electrode current collector 11, the positive electrode active material layer 12, and the insulating member 13. The negative electrode 30 includes a negative electrode current collector 31 and a negative electrode active material layer 32. The positive electrode active material layer 12 is formed on each surface of the positive electrode current collector 11. The negative electrode active material layer 32 is formed on each surface of the negative electrode current collector 31. In FIG. 2, one set of the positive electrode 10, the separator 20, and the negative electrode 30 is stacked; thus, one battery element is formed. In the positive electrode active material layer 12, a part where the positive electrode active material is provided with a predetermined thickness is the positive electrode active material layer flat part 121 and a part where the positive electrode active material is provided with small thickness is the positive electrode active material layer thin part 122. A part of the positive electrode active material layer thin part 122 is covered with the insulating member 13.

Of the positive electrode active material layer thin part 122, a part that is not covered with the insulating member 13 (in FIG. 2, first part 124) has a positive electrode charging capacity $C_E$ at an initial charging. A part of the negative electrode (in FIG. 2, second part 324) that faces the positive electrode active material layer part 124 through the separator 20 has a negative electrode charging capacity of $A_E$ at an initial charging. The charging capacity ratio $A_E/C_E$ of those parts is in a range of more than 1.10 to less than 1.34. The charging capacity of the positive electrode and the negative electrode is determined based on the amount of applying each electrode active material. Therefore, the charging capacity of a particular part of the positive electrode and the negative electrode can be calculated from the amount of applying each electrode active material on that part. When the charging capacity ratio of those parts $A_E/C_E$ is in a range of more than 1.10 to less than 1.34, the negative electrode has substantially higher charging capacity near the border part of each electrode active material layer (that is, the border part between the electrode active material applied part and the electrode active material non-applied part). That is to say, theoretically, even if lithium ions in the positive electrode active material in that part have moved entirely to the negative electrode active material on the opposite side, there is still vacancy in the corresponding part of the negative electrode. It can be considered that this results in a loss when considering the charging capacity of the entire battery; however, this will not happen.

When the lithium ion secondary battery is charged, the lithium ions move from the positive electrode active material to the negative electrode active material. On the contrary, when the battery is discharged, the lithium ions return from the negative electrode active material to the positive electrode active material. Here, all the lithium ions that have been intercalated in the negative electrode active material do not necessarily return to the positive electrode active material. That is to say, some lithium ions may remain in the negative electrode active material in a state of being intercalated in the negative electrode active material. There are various reasons why the lithium ions remain in the negative electrode active material. The reasons are, for example, the intercalation of lithium ions into an irregular structure part in the negative electrode active material, the formation of a film on the electrode because of the solvent decomposition of the electrolyte solution, and the partial collapse of the negative electrode active material.

On the other hand, when the battery is charged at a practical speed, intercalation of lithium in the entire vacancies in the negative electrode may fail and lithium may be deposited as metal lithium on the surface of the negative electrode. Thus, providing the value of $A_E/C_E$ with a margin suppresses the loss as a result. In this manner, it has been understood that setting the charging capacity ratio in a particular range of values can reduce the vacancies of the negative electrode as much as possible and reduce the deposition of metal lithium as much as possible. When the charging capacity of the positive electrode is more than the charging capacity of the negative electrode (the charging capacity ratio is less than 1), it is difficult for the negative electrode to accept all the lithium ions having moved from the positive electrode. The excess lithium ions may be deposited on the negative electrode to form a dendrite, and through the separator, result in the short-circuiting of the battery. In order to suppress this, it is preferable that the charging capacity of the negative electrode is set a little higher instead of setting the charging capacity ratio $A_E/C_E$ to 1 exactly (that is, equating the positive electrode charging capacity of that part and the negative electrode charging capacity of the part facing that part). The charging capacity ratio $A_E/C_E$ is preferably in a range of more than 1.10 to less than 1.34.

In addition, the positive electrode charging capacity at the initial charging of the positive electrode active material layer flat part (121 in FIG. 2) is $C_C$ and the negative electrode charging capacity at the initial charging of a part of the negative electrode (in FIG. 2, third part 321) that faces the positive electrode active material layer flat part 121 through the separator is $A_C$. The charging capacity ratio $A_C/C_C$ of those parts is in a range of more than 1.05 to less than 1.20. This means that the negative electrode has substantially higher charging capacity also in other part than the border part of each electrode active material layer (that is, border part between each electrode active material applied part and non-applied part). Thus, in those parts, the irreversible lithium ion generation can be suppressed.

More preferably, the value of the charging capacity ratio $A_E/C_E$ is larger than the value of the charging capacity ratio $A_C/C_C$. When the value of the charging capacity ratio at an end of each electrode active material layer is larger than the value of the charging capacity ratio of the other parts, the risk of the deposition of metal lithium can be reduced. The deposition of metal lithium at the end of the electrode active material layer occurs because of a structural reason; for example, the distance between the electrodes tends to be wider at the end of the electrode active material layer than in the other parts. In order to suppress such inconvenience, it is preferable that the charging capacity ratio $A_E/C_E$ is in a range of more than 1.15 to less than 1.34 and the charging capacity ratio $A_C/C_C$ is in a range of more than 1.05 to less than 1.10. In particular, it is the most preferable that the charging capacity ratio $A_E/C_E$ is in a range of 1.17 or more to 1.32 or less and the charging capacity ratio $A_C/C_C$ is in a range of 1.07 or more to 1.09 or less.

It is preferable that a border part between the negative electrode active material applied part and the negative electrode active material non-applied part is on the outside of a border part between the positive electrode active material applied part and the positive electrode active material non-applied part. Here, "the border part between the negative electrode active material applied part and the negative electrode active material non-applied part is on the outside of the border part between the positive electrode active material applied part and the positive electrode active material non-applied part" means that the electrodes are overlapped on each other so that, at the end of the battery element, the border part between the negative electrode active material applied part and the negative electrode active material non-applied part is positioned in the direction of the positive electrode active material non-applied part as compared to the border part between the positive electrode active material applied part and the positive electrode active material non-applied part. That is to say, preferably, the active materials are applied so that the area of the negative electrode active material layer is larger than the area of the positive electrode active material layer. When the area of the negative electrode active material layer 32 is larger than the area of the positive electrode active material layer 12, the capacity of the negative electrode active material layer can be made larger than the capacity of the positive electrode active material layer. Therefore, as described above, the generation of lithium dendrite can be suppressed. In the example of the lithium ion secondary battery element illustrated in FIG. 2, the border part between the negative electrode active material applied part and the negative electrode active material non-applied part is on the outside of the border part between the positive electrode active material applied part and the positive electrode active material non-applied part.

Figure 3A:
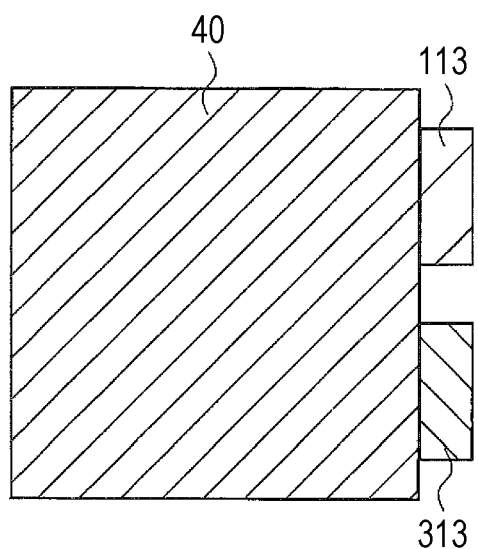
FIG. 3A is a top view of a general lithium ion secondary battery and FIG. 3B is a side view thereof.
Figure 3B:
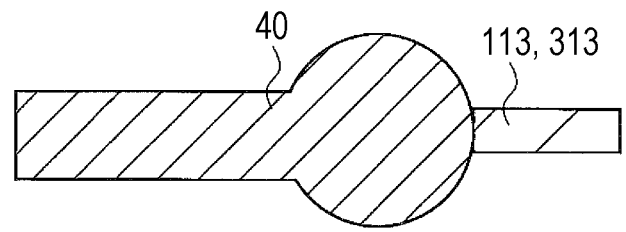

Next, a structure example of a general lithium ion secondary battery is described. FIG. 3A and FIG. 3B are diagrams illustrating an example of an external shape of the lithium ion secondary battery. In FIG. 3A and FIG. 3B, the size, scale, and the like of each component are different from the actual ones. FIG. 3A is a top view of the general lithium ion secondary battery and FIG. 3B is a side view thereof. As illustrated in FIG. 3A, the general lithium ion secondary battery includes a package 40, a positive electrode tab 113, and a negative electrode tab 313. The positive electrode tab 113 and the negative electrode tab 313 are extracted from one side of the lithium ion secondary battery with a rectangular shape as a whole. As illustrated in FIG. 3B, the positive electrode (negative electrode) tab 113 (313) is extracted from the package 40. In FIG. 3B, an end of the package 40, that is, an end where the positive electrode tab 113 and the negative electrode tab 313 are extracted and sealed is expanded. This is because an insulating member (not shown in FIG. 3A or FIG. 3B) is provided to cover at least a part of the positive electrode active material layer thin part and at least a part of the positive electrode active material non-applied part. This expansion part is described with reference to FIG. 4.

Figure 4:
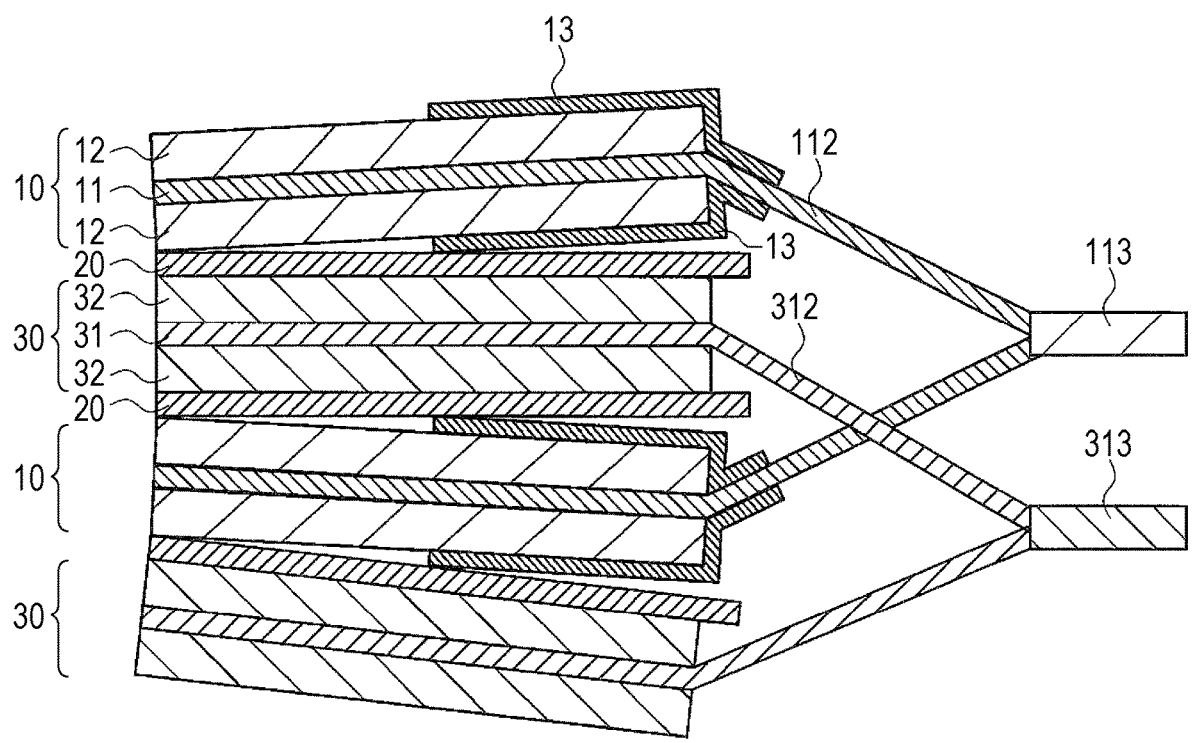
FIG. 4 illustrates a structure example of an end of the general lithium ion secondary battery element.

FIG. 4 illustrates a structure example of the end of the general lithium ion secondary battery element. In FIG. 4, the size, scale, and the like of each component are different from the actual ones. As illustrated in FIG. 4, this battery includes the positive electrode 10, the positive electrode current collector 11, the positive electrode active material layer 12, the insulating member 13, the positive electrode lead (positive electrode active material non-applied part) 112, the positive electrode tab 113, the separator 20, the negative electrode 30, the negative electrode current collector 31, the negative electrode active material layer 32, a negative electrode lead (negative electrode active material non-applied part) 312, and the negative electrode tab 313. In the illustration in FIG. 4, the positive electrode 10, the separator 20, and the negative electrode 30 are arranged and spaced apart from each other. In fact, however, these members are stacked in contact with the adjacent members. As illustrated in FIG. 4, the thickness of the positive electrode active material layer 12 is uniform entirely. Here, the insulating members 13 are present overlapping with each other at the end of the battery. In this case, as the number of insulating members 13 is increased, the thickness of the end of the battery element is increased as compared to the other parts; thus, the end may expand. When such a battery element is covered with the package, the battery with the expanded end as illustrated in FIG. 3B may be obtained. The expansion part that is locally generated at the end of the battery reduces the energy density per volume; therefore, the battery characteristics may vary. In addition, it is difficult to stack the batteries with non-uniform thickness. Thus, it is difficult to mount (place) such batteries easily in an automobile or an electric device.

Figure 5A:
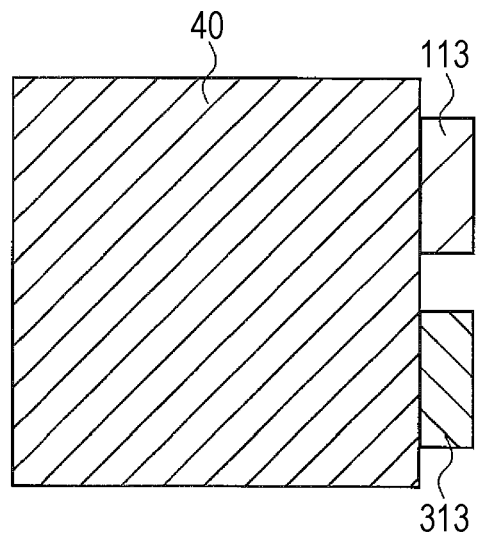
FIG. 5A is a top view of a lithium ion secondary battery according to the embodiment of the present disclosure.
Figure 5B:
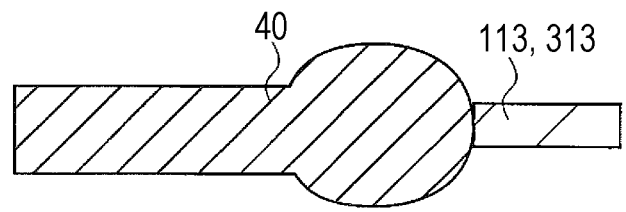
FIG. 5B is a side view thereof.

Next, a structure of the lithium ion secondary battery according to the embodiment of the present disclosure is described. FIG. 5A and FIG. 5B illustrate an example of an external shape of the lithium ion secondary battery. In FIG. 5A and FIG. 5B, the size, scale, and the like of each component are different from the actual ones. FIG. 5A is a top view of the lithium ion secondary battery and FIG. 5B is a side view thereof. As illustrated in FIG. 5A, the lithium ion secondary battery includes the package 40, the positive electrode tab 113, and the negative electrode tab 313. The positive electrode tab 113 and the negative electrode tab 313 are extracted from one side of the lithium ion secondary battery with a rectangular shape as a whole. As illustrated in FIG. 5B, the positive electrode (negative electrode) tab 113 (313) is extracted from the package 40. In FIG. 5B, an end of the package 40, that is, an end where the positive electrode tab 113 and the negative electrode tab 313 are extracted and sealed is a little expanded. This is because an insulating member (not shown in FIG. 5A or FIG. 5B) is provided to cover at least a part of the positive electrode active material layer thin part and at least a part of the positive electrode active material non-applied part. This expansion part is described with reference to FIG. 6.

Figure 6:
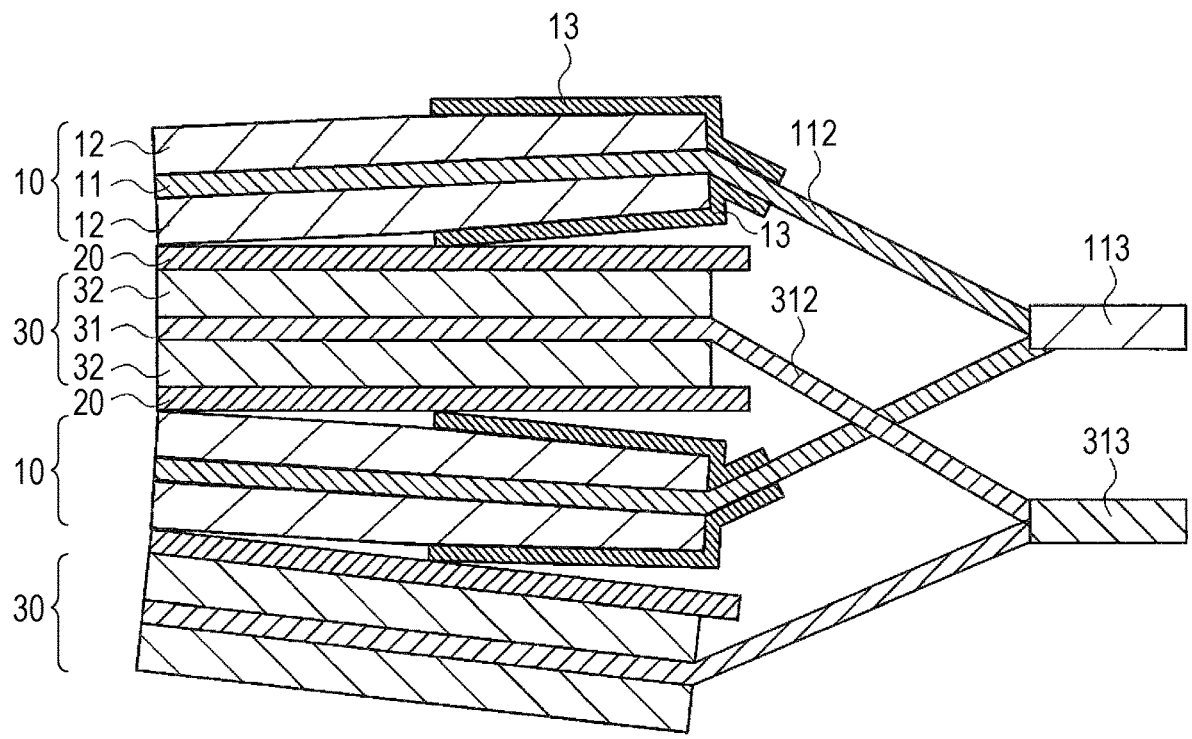
FIG. 6 illustrates a structure of an end of the lithium ion secondary battery element.

FIG. 6 illustrates a structure of the end of the lithium ion secondary battery element according to the embodiment of the present disclosure. In FIG. 6, the size, scale, and the like of each component are different from the actual ones. As illustrated in FIG. 6, this battery includes the positive electrode 10, the positive electrode current collector 11, the positive electrode active material layer 12, the insulating member 13, the positive electrode lead (positive electrode active material non-applied part) 112, the positive electrode tab 113, the separator 20, the negative electrode 30, the negative electrode current collector 31, the negative electrode active material layer 32, the negative electrode lead (negative electrode active material non-applied part) 312, and the negative electrode tab 313. In the illustration in FIG. 6, the positive electrode 10, the separator 20, and the negative electrode 30 are arranged and spaced apart from each other. In fact, however, these members are stacked in contact with the adjacent members. As illustrated in FIG. 6, the positive electrode active material layer 12 includes the positive electrode active material layer flat part and the positive electrode active material layer thin part. As the number of insulating members 13 is increased, the thickness of the end of the battery element is increased. However, since the positive electrode active material layer thin part exists, the expansion of the end (increase in thickness) can be suppressed. When such a battery element is covered with the package, the battery with the end a little expanded as illustrated in FIG. 5B can be obtained.

In this manner, the positive electrode in the lithium ion secondary battery element according to the embodiment includes the positive electrode active material layer including the positive electrode active material layer thin part and the positive electrode active material layer flat part (FIG. 6). The positive electrode active material layer thin part is the part that becomes thinner toward the border part between the positive electrode active material applied part and the positive electrode active material non-applied part.

Figure 7:
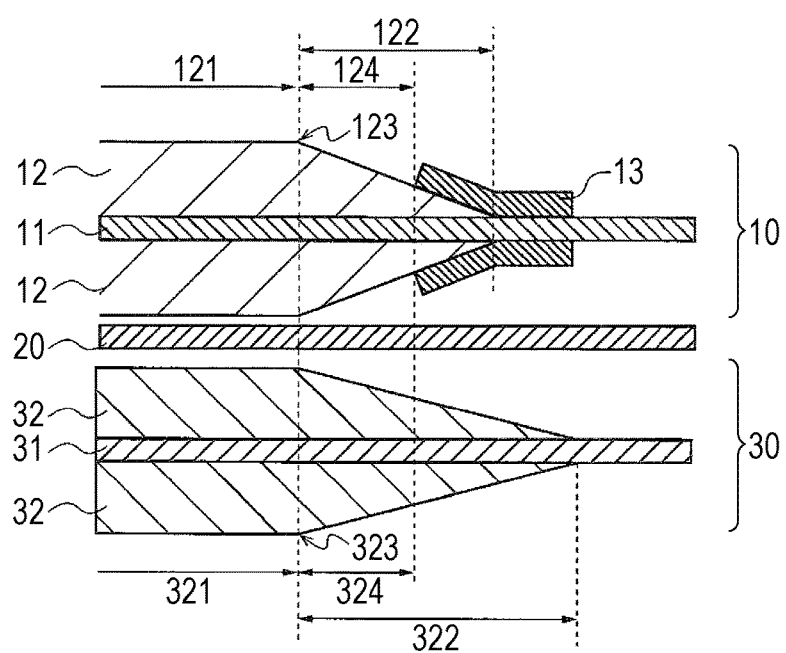
FIG. 7 illustrates a structure of an end of the lithium ion secondary battery element.

It is possible that the end of the battery element expands more than a desired value because each insulating member 13 is thick or the number of insulating members 13 is large. In view of this, not just the positive electrode active material layer but also the negative electrode active material layer may include a negative electrode active material layer thin part 322 and the negative electrode active material layer flat part 321 (FIG. 7). The negative electrode active material layer thin part 322 is a part that becomes thinner toward the border part between the negative electrode active material applied part and the negative electrode active material non-applied part. In FIG. 7, the size, scale, and the like of each component are different from the actual ones.

In FIG. 7, the negative electrode active material layer thin part 322 is provided to become sequentially thinner toward the border part between the negative electrode active material applied part and the negative electrode active material non-applied part. Instead of this, the negative electrode active material layer thin part 322 with a predetermined thickness may be provided. That is to say, it is important that the thickness of the negative electrode active material layer thin part 322 is smaller than that of the negative electrode active material layer flat part 321. In other words, the negative electrode active material layer thin part 322 includes a part that is thinner than the negative electrode active material layer flat part 321. It is preferable that the negative electrode active material layer thin part 322 has substantially constant thickness that is smaller than the thickness of the negative electrode active material layer flat part 321. A portion where the negative electrode active material layer thin part 322 starts, that is, a border part between the negative electrode active material layer flat part 321 and the negative electrode active material layer thin part 322 corresponds to a start end.

The positive electrode 10 includes the positive electrode current collector 11 and the positive electrode active material layer 12. The positive electrode active material layer 12 includes the positive electrode active material layer flat part 121 and the positive electrode active material layer thin part 122. The negative electrode 30 includes the negative electrode current collector 31 and the negative electrode active material layer 32. The negative electrode active material layer 32 includes the negative electrode active material layer flat part 321 and the negative electrode active material layer thin part 322. The ends of the positive electrode 10, the separator 20, and the negative electrode 30 are separated from each other in FIG. 7. However, in fact, these ends are stacked in contact with the adjacent ends. That is to say, the expansion of the battery end can be minimized.

Here, a start end 323 of the negative electrode active material layer thin part 322 and a start end 123 of the positive electrode active material layer thin part 122 are disposed to face each other through the separator 20. When both start ends face each other, the positive electrode 10, the separator 20, and the negative electrode 30 are stacked so that these two start ends come to the same position as illustrated in FIG. 7, for example. In this case, the negative electrode active material layer thin part 322 and the positive electrode active material layer thin part 122 are disposed to face each other. Therefore, even if each insulating member 13 is thick or the number of insulating members 13 is large, the expansion of the end of the battery element can be reduced.

In addition, although not shown, it is also possible that the start end 323 of the negative electrode active material layer thin part faces the positive electrode active material layer thin part 122 through the separator 20. In this case, the start end 323 of the negative electrode active material layer thin part is on the outside of the start end 123 of the positive electrode active material layer thin part. Here, "the start end 323 of the negative electrode active material layer thin part is on the outside of the start end 123 of the positive electrode active material layer thin part" means that at the end of the battery element, the start end 323 of the negative electrode active material layer thin part is positioned in the direction of the positive electrode active material non-applied part as compared to the start end 123 of the positive electrode active material layer thin part. In such a structure, as compared to the case in which the start end 323 of the negative electrode active material layer thin part and the start end 123 of the positive electrode active material layer thin part face each other, the area of the negative electrode active material layer flat part 321 can be increased. Thus, the capacity of the negative electrode active material layer can be increased to be higher than the capacity of the positive electrode active material layer. As a result, the generation of lithium dendrite can be suppressed as described above. Furthermore, if the negative electrode active material layer thin part 322 and the positive electrode active material layer thin part 122 are disposed to face each other, the expansion of the end of the battery element can be reduced more effectively.

In addition, in the entire surface of the negative electrode active material layer, preferably, the thickness of the negative electrode active material layer is larger than that of the positive electrode active material layer that faces the negative electrode active material layer through the separator. Here, it becomes easier to increase the capacity of the negative electrode active material layer to be higher than the capacity of the positive electrode active material layer. As a result, the generation of lithium dendrite can be suppressed.

A plurality of lithium ion secondary battery elements according to the embodiment of the present disclosure as illustrated in FIG. 2, FIG. 5A, FIG. 5B, FIG. 6, and FIG. 7 are stacked through the separators. By collectively bonding the positive electrode leads extending from the positive electrode current collectors, the positive electrode tab is formed. By collectively bonding the negative electrode leads extending from the negative electrode current collectors, the negative electrode tab is formed. Note that an aluminum plate is preferably used as the positive electrode tab, and a copper plate is preferably used as the negative electrode tab. In some cases, the positive electrode tab and the negative electrode tab may be coated partially with other metal (such as nickel, tin, or solder) or a polymer material. The battery formed by stacking the plural battery elements in this manner is packed by the package so that the welded positive electrode tab and negative electrode tab are extracted to the outside. The electrolyte solution is poured into the package. The periphery of the package is heat-sealed. Thus, the lithium ion secondary battery according to the embodiment is formed.

EXAMPLES

<Manufacture of Positive Electrode>

A lithium nickel manganese cobalt composite oxide NCM523, carbon black powder (CB) as a conductive agent, and PVDF as the binder resin (#7200, Kureha Battery Materials Japan Co., Ltd.) were mixed so that composite oxide:CB:PVDF=90:5:5 in solid content mass ratio. Thus, a mixture was obtained. This mixture was added to N-methyl pyrrolidone (NMP) as a solvent. To this mixture, oxalic anhydride (molecular weight: 90) as the organic moisture scavenger was added. This oxalic anhydride was added by 0.03 parts by mass relative to 100 parts by mass of the solid content obtained by subtracting NMP from the mixture. The mixture containing the oxalic anhydride was subjected to dispersive mixing by a planetary method for 30 minutes. Thus, slurry with the above materials uniformly dispersed was prepared.

The obtained slurry was applied on each surface of a 20-m-thick rectangular aluminum foil serving as the positive electrode current collector by a doctor blade method. In this application, the slurry was not applied to only one side of the rectangular positive electrode current collector, and the size of the part where the slurry (positive electrode active material mixture) was applied was 20 cm×20 cm. In addition, the positive electrode active material layer thin part with a width of 20 mm was provided at the border part between the positive electrode active material non-applied part provided in this manner, and the positive electrode active material applied part. Next, drying was performed at 100° C. to evaporate NMP, and thus, the positive electrode active material layer was formed. In addition, the obtained electrode was roll-pressed; thus, the positive electrode active material layer was formed. An insulating tape (adhesive tape formed by applying an adhesive resin on a polypropylene sheet) with a thickness of 30 µm and a width of 10 mm) was pasted to cover a 5-mm-width part of the positive electrode active material thin part with a width of 20 mm that is provided as above. Note that the amount of applying the positive electrode active material was calculated so that the predetermined charging capacity ratios $A_E/C_E$ and $A_C/C_C$ (according to Table 1) were obtained on the basis of the charging capacity of the negative electrode (described below) including the negative electrode active material layer with a predetermined thickness, and thus the plurality of positive electrodes with the different charging capacities were manufactured.

<Manufacture of Negative Electrode>

As the negative electrode active material, natural graphite powder was used. This carbon material powder, styrene butadiene rubber (SBR) as the binder resin, carboxymethyl cellulose (CMC), and carbon black powder (CB) as the conductive agent were mixed uniformly in a solid content mass ratio of graphite powder:SBR:CMC:CB=91:2:2:5. Thus, a mixture was obtained. The obtained mixture was added to pure water as a solvent; thus, slurry was prepared. The obtained slurry was applied on each surface of a rectangular 10-µm-thick copper foil serving as the negative electrode current collector by a doctor blade method so that the weight after drying became 10 mg/cm$^2$ on each surface. In this application, the slurry was not applied to only one side of the rectangular negative electrode current collector, and the size of the part where the slurry (negative electrode active material mixture) was applied was 21 cm×21 cm. Next, the electrode after being dried at 100° C. was roll-pressed; thus, the negative electrode including the negative electrode active material layer was formed.

<Separator>

A polypropylene separator with a porosity of 60%, a thickness of 25 μm, and a size of 22 cm×22 cm was prepared.

<Electrolyte Solution>

Ethylene carbonate (EC) and diethyl carbonate (DEC) were mixed in a volume ratio of EC:DEC=70:30, so that a nonaqueous solvent containing 1 wt % of vinylene carbonate (VC) was prepared. Into this mixed nonaqueous solvent, lithium hexafluorophosphate (LiPF$_6$) as the electrolyte salt was dissolved so that the concentration thereof became 1 mol/L. The resultant solution was used as the electrolyte solution.

<Package>

As the laminate film for the package, stacked films including nylon with a thickness of 25 μm, soft aluminum with a thickness of 40 μm, and polypropylene with a thickness of 40 μm were used.

<Manufacture of Lithium Ion Secondary Battery>

The positive electrode and the negative electrode manufactured as above were disposed to overlap with each other through the separator, and thus the battery element was obtained. Here, the positive electrode and the negative electrode were stacked so as to face in the same direction in a manner that the positive electrode active material non-applied part and the negative electrode active material non-applied part were disposed on the same side (i.e., face each other through the separator). This is to derive each electrode tab from one side of the rectangular battery. The negative electrode, the separator, the positive electrode, and the separator were stacked repeatedly in this order until 11 negative electrodes were stacked. The aluminum plate to serve as the positive electrode tab and the positive electrode active material layer non-applied parts of 10 positive electrodes were collectively welded by ultrasonic waves. Similarly, the copper plate plated with nickel to serve as the negative electrode tab and the negative electrode active material layer non-applied parts of 11 negative electrodes were collectively welded by ultrasonic waves. Then, to a negative electrode current collector extension part of a negative electrode plate, an inner end (one end) of a negative electrode terminal was welded. Between the two rectangular laminate films, the stack was held. Three sides of the laminate film were sealed and after 100 g of the electrolyte solution was poured, the remaining one side was sealed. Thus, the stack type lithium ion battery was completed. This stack type lithium ion battery was subjected to the initial charging (up to 4.2 V at 0.2 C) and then discharging to 2.5 V at 0.2 C. Thus, the lithium ion battery for evaluation was obtained.

<Evaluation on Lithium Ion Secondary Battery Element>

The obtained lithium ion battery was charged up to 4.2 V at 0.2 C so that a fully charged state was obtained. The lithium ion battery was discharged to 2.5 V at 0.2 C and thus, the charging capacity of each battery was measured. Assuming that the charging capacity of the battery according to Example 1 is 100, the charging capacity of the other batteries was standardized. Next, each battery was CC/CV charged up to 4.2 V at 1 C, and CC discharged to 2.5 V at 1 C, and this process was repeated 500 times. By comparing the discharging capacity after the first discharging and the discharging capacity after the 500-th discharging, the discharging capacity retention was obtained.

TABLE 1

| | $A_C/C_C$ | $A_E/C_E$ | Battery capacity | Discharging capacity retention % |
|---|---|---|---|---|
| Example 1 | 1.09 | 1.19 | 100 | 90 |
| Example 2 | 1.07 | 1.17 | 101 | 90 |
| Example 3 | 1.09 | 1.32 | 100 | 90 |
| Comparative Example 1 | 1.09 | 1.09 | 100 | 85 |
| Comparative Example 2 | 1.22 | 1.34 | 96 | 90 |

The batteries (Examples 1 to 3) with the charging capacity ratios $A_E/C_E$ and $A_C/C_C$ in the range defined in the embodiment of the present disclosure retained a capacity of 90% or more even after the 500 charging and discharging cycles. On the other hand, the battery according to Comparative Example 1 in which the value of the charging capacity ratio $A_E/C_E$ does not satisfy the range defined in the embodiment of the present disclosure was inferior in the cycle capacity retention. In addition, the battery according to Comparative Example 2 in which both the values of the charging capacity ratios $A_E/C_E$ and $A_C/C_C$ do not satisfy the range defined in the embodiment of the present disclosure had low battery capacity although having a cycle capacity retention of 90%; thus, this battery was not durable in the use as the high-capacity battery.

The examples of the present disclosure have been described so far; however, the above examples merely describe examples of the embodiment of the present disclosure and will not limit the technical range of the present disclosure to a particular embodiment or a specific structure.

The embodiment of the present disclosure may be any of first to eighth lithium ion secondary battery elements and a first lithium ion secondary battery that are described below.

The first lithium ion secondary battery element is a lithium ion secondary battery element including: a positive electrode where a positive electrode active material is applied on at least a part of a positive electrode current collector, the positive electrode current collector including a positive electrode active material layer where the positive electrode active material is applied and a positive electrode active material non-applied part where the positive electrode active material is not applied, the positive electrode active material layer including a positive electrode active material layer flat part and a positive electrode active material layer thin part in which the thickness of the positive electrode active material layer decreases toward a border part between the positive electrode active material applied part and the positive electrode active material non-applied part, and the positive electrode including an insulating member that covers at least a part of the positive electrode active material layer thin part and at least a part of the positive electrode active material non-applied part; a separator; and a negative electrode where a negative electrode active material is applied on at least a part of a negative electrode current collector, the negative electrode current collector including a negative electrode active material applied part where the negative electrode active material is applied and a negative electrode active material non-applied part where the negative electrode active material is not applied, wherein: the positive electrode, the separator, and the negative electrode are stacked in this order so that the positive electrode active material non-applied part and the negative electrode active material non-applied part face each other through the separator; when a positive electrode charging capacity at an initial charging of a part of the positive electrode active material layer thin part that is not covered with the insulating member is $C_E$ and a negative electrode charging capacity at the initial charging of the negative electrode that faces the part of the positive electrode active material layer through the separator is $A_E$, a charging capacity ratio $A_E/C_E$ of the part is in a range of more than 1.10 to less than 1.34; when a positive electrode charging capacity at the initial charging of the positive electrode active material layer flat part is $C_C$ and a negative electrode charging capacity at the initial charging of the negative electrode that faces the part of the positive electrode active material layer through the separator is $A_C$, a charging capacity ratio $A_C/C_C$ of the part is in a range of more than 1.05 to less than 1.20; and a value of the charging capacity ratio $A_E/C_E$ is larger than a value of the charging capacity ratio $A_C/C_C$.

The second lithium ion secondary battery element is the first lithium ion secondary battery element, wherein the charging capacity ratio $A_E/C_E$ is in a range of more than 1.15 to less than 1.34, and the charging capacity ratio $A_C/C_C$ is in a range of more than 1.05 to less than 1.10.

The third lithium ion secondary battery element is the first or second lithium ion secondary battery element, wherein the charging capacity ratio $A_E/C_E$ is 1.17 or more and 1.32 or less, and the charging capacity ratio $A_C/C_C$ is 1.07 or more and 1.09 or less.

The fourth lithium ion secondary battery element is any of the first to third lithium ion secondary battery elements, wherein a border part between the negative electrode active material applied part and the negative electrode active material non-applied part is on the outside of a border part between the positive electrode active material layer and the positive electrode active material non-applied part.

The fifth lithium ion secondary battery element is any of the first to fourth lithium ion secondary battery elements, wherein the negative electrode active material layer includes a negative electrode active material layer flat part and a negative electrode active material layer thin part in which the thickness of the negative electrode active material layer decreases toward the border part between the negative electrode active material applied part and the negative electrode active material non-applied part.

The sixth lithium ion secondary battery element is the fifth lithium ion secondary battery element, wherein a start end of the negative electrode active material layer thin part faces a start end of the positive electrode active material layer thin part through the separator.

The seventh lithium ion secondary battery element is the fifth lithium ion secondary battery element, wherein a start end of the negative electrode active material layer thin part faces the positive electrode active material layer thin part through the separator.

The eighth lithium ion secondary battery element is any one of the first to seventh lithium ion secondary battery elements, wherein on an entire surface of the negative electrode active material layer, the negative electrode active material layer is thicker than the positive electrode active material layer that faces the negative electrode active material layer through the separator.

The first lithium ion secondary battery includes in a package, a power generating element including any one of the first to eighth lithium ion secondary battery elements, and an electrolyte solution.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A lithium ion secondary battery element comprising:
   a positive electrode that includes a positive electrode current collector including a positive electrode active material applied part where a positive electrode active material is applied to form a positive electrode active material layer, and including a positive electrode active material non-applied part where the positive electrode active material is not applied,
   the positive electrode active material layer including a positive electrode active material layer flat part and a positive electrode active material layer thin part that is thinner than the positive electrode active material layer flat part, and
   the positive electrode further including an insulating member that covers at least a part of the positive electrode active material layer thin part and at least a part of the positive electrode active material non-applied part;
   a separator; and
   a negative electrode that includes a negative electrode current collector including a negative electrode active material applied part where a negative electrode active material is applied to form a negative electrode active material layer, and including a negative electrode active material non-applied part where the negative electrode active material is not applied, wherein:
   the positive electrode, the separator, and the negative electrode are stacked in this order;
   the positive electrode active material non-applied part and the negative electrode active material non-applied part face each other through the separator;
   when a positive electrode charging capacity at an initial charging of a first part of the positive electrode active material layer thin part that is not covered with the insulating member is $C_E$ and a negative electrode charging capacity at the initial charging of a second part of the negative electrode that faces the first part through the separator is $A_E$, a charging capacity ratio $A_E/C_E$ is in a range of more than 1.10 to less than 1.34;
   when a positive electrode charging capacity at the initial charging of the positive electrode active material layer flat part is $C_C$ and a negative electrode charging capacity at the initial charging of a third part of the negative electrode that faces the positive electrode active material layer flat part through the separator is $A_C$, a charging capacity ratio $A_C/C_C$ is in a range of more than 1.05 to less than 1.20; and
   a value of the charging capacity ratio $A_E/C_E$ is larger than a value of the charging capacity ratio $A_C/C_C$.

2. The lithium ion secondary battery element according to claim 1, wherein
   the positive electrode active material layer thin part is a part that becomes thinner toward a border part between the positive electrode active material applied part and the positive electrode active material non-applied part.

3. The lithium ion secondary battery element according to claim 1, wherein:
   the charging capacity ratio $A_E/C_E$ is in a range of more than 1.15 to less than 1.34; and the charging capacity ratio $A_C/C_C$ is in a range of more than 1.05 to less than 1.10.

4. The lithium ion secondary battery element according to claim 1, wherein:
the charging capacity ratio $A_E/C_E$ is in a range of 1.17 or more to 1.32 or less; and
the charging capacity ratio $A_C/C_C$ is in a range of 1.07 or more to 1.09 or less.

5. The lithium ion secondary battery element according to claim 1, wherein
a border part between the negative electrode active material applied part and the negative electrode active material non-applied part is on the outside of the border part between the positive electrode active material applied part and the positive electrode active material non-applied part.

6. The lithium ion secondary battery element according to claim 1, wherein
the negative electrode active material layer includes a negative electrode active material layer flat part and a negative electrode active material layer thin part that is thinner than the negative electrode active material layer flat part.

7. The lithium ion secondary battery element according to claim 6, wherein
the negative electrode active material layer thin part is a part that becomes thinner toward the border part between the negative electrode active material applied part and the negative electrode active material non-applied part.

8. The lithium ion secondary battery element according to claim 6, wherein
a start end of the negative electrode active material layer thin part corresponding to a border part between the negative electrode active material layer flat part and the negative electrode active material layer thin part faces, through the separator, a start end of the positive electrode active material layer thin part corresponding to a border part between the positive electrode active material layer flat part and the positive electrode active material layer thin part.

9. The lithium ion secondary battery element according to claim 6, wherein
a start end of the negative electrode active material layer thin part corresponding to the border part between the negative electrode active material layer flat part and the negative electrode active material layer thin part faces, through the separator, the positive electrode active material layer thin part.

10. The lithium ion secondary battery element according to claim 1, wherein
on an entire surface of the negative electrode active material layer, the negative electrode active material layer is thicker than the positive electrode active material layer that faces the negative electrode active material layer through the separator.

11. A lithium ion secondary battery comprising:
a power generating element including the lithium ion secondary battery element according to claim 1, and an electrolyte solution; and
a package including therein the power generating element.

* * * * *